United States Patent [19]

Sliva et al.

[11] Patent Number: 4,818,841
[45] Date of Patent: Apr. 4, 1989

[54] METHOD FOR IDENTIFYING THE POWER OUTPUT BY A LASER ONTO A WORKPIECE

[75] Inventors: Eduard Sliva; Wolfgang Stark, both of Munich, Fed. Rep. of Germany

[73] Assignee: Siemens Aktiengesellschaft, Berlin and Munich, Fed. Rep. of Germany

[21] Appl. No.: 173,366

[22] Filed: Mar. 25, 1988

[30] Foreign Application Priority Data

Mar. 26, 1987 [DE] Fed. Rep. of Germany ....... 3709904

[51] Int. Cl.⁴ ............................................. B23K 26/00
[52] U.S. Cl. ................................................ 219/121.83
[58] Field of Search ................. 216/121 LJ, 121 GH, 216/121 LZ; 219/121.68, 121.69, 121.83, 121.61

[56] References Cited

U.S. PATENT DOCUMENTS 3,700,850 10/1972 Lumley et al. ................ 219/121 LJ
3,986,391 10/1976 Vahaviolos .............. 219/121 LZ X
4,413,507 11/1983 Drew et al. ........................... 73/104
4,507,536 3/1985 Inoue ....................... 219/121 LZ X

OTHER PUBLICATIONS

Welding Journal, Feb. 1985.
Journal of the Acoustical Society of America, Aug. 2, 1982.
Ingenieur Digest, Oct. 1972.

Primary Examiner—C. L. Albritton
Attorney, Agent, or Firm—Hill, Van Santen, Steadman & Simpson

[57] ABSTRACT

A method for identifying laser power evaluates the sound emission signal arising in a workpiece during processing and represents the power of the laser. A calibration curve is established through a plurality of measuring points and is linearized over certain regions to assign a defined power to each mean frequency of the sound emission signal. Undesired deviations of the power can be identified, without problem, by introducing defined tolerance limits of the registered frequency.

2 Claims, 1 Drawing Sheet

METHOD FOR IDENTIFYING THE POWER OUTPUT BY A LASER ONTO A WORKPIECE

BACKGROUND OF THE INVENTION

1. Field of the Invention:

The present invention is directed to a method for identifying a power output by a laser onto a workpiece, and more particularly to identifying the power output by a laser onto a workpiece in laser welding based on the dependency of sound emission signals which occur in the workpiece.

2. Description of the Prior Art

Previous methods for estimating the laser power output onto a workpiece either use a temperature measurement in the workpiece for this purpose, or measure the laser light power not absorbed by the workpiece, this then being subtracted from the set laser power. As can be seen from the German Pat. No. 30 29 957, corresponding to the European application No. 0 045 942, the sound emission signal occurring during a cutting process is evaluated for judging the wear at cutting tools. Sound emission analysis is based on the phenomenon that glide processes or, respectively, phase conversions occurring during the deformation of a metal emit sound pulses whose frequencies extend far into the ultrasound region. In general, the sound emission analysis is utilized as a method for non-destructive metals testing. A precise description thereof is supplied in the article "Schallemissionsanalyse", published in the Ingenieur Digest, Vol. 11, No. 10, 1972, pp. 62 et sec.

SUMMARY OF THE INVENTION

The object of the present invention is to provide a method with which the power output onto a workpiece can be identified when processing a workpiece with a laser.

The above object is achieved, according to the present invention, in that the dependency of the sound emission signals, appearing in the workpiece when processing with a laser, on the laser power is interpreted for the identification of the laser power.

When processing with a laser, sound emission signals arise in the workpiece, these being capable of being acquired with a piezoelectric sensor and converted into electrical signals. Such signals can be evaluated for practical measurements in a frequency range of 50 kHz–1.5 MHz. The sound emission signal is composed of a plurality of superimposed oscillations and of a plurality of individual pulses emitted in rapid succession. When the respective sound emission signal is then registered at different laser powers, then the dependency of the laser power on the formation of the sound emission signal can be represented in a diagram in the form of a continuous function that is linear in the specific instance. The amplitude or the frequency of the overall signal, or of a defined oscillation contained therein, can be interpreted as characteristic of the sound emission signal.

A particularly advantageous feature of the invention provides that the zero-axis crossings of the sound emission signal are counted and, divided by two, yield a mean frequency of this signal. The dependency of the laser power on this mean frequency of the sound emission signal yields a calibration curve that exactly connects the mean frequency and the laser power to one another.

In order to make involved measurement unnecessary for setting a calibration curve, it is advantageous to distribute a plurality of measuring points uniformly over the range of laser power or, respectively, over the mean frequency of the sound emission signal coming into consideration, and to assume that the intervening regions are linear.

A simple arrangement in order to obtain a prescribed, mean frequency of a sound emission signal provides that the sound emission signals are acquired by the piezoelectric sensor and are converted into electromagnetic signals and, by way of a preamplifier comprising a filter and a main amplifier comprising a filter, are supplied to a zero-axis crossing detector that calculates the mean frequency of the signal.

A further, particular feature of the invention uses a trigger circuit that, in the case of laser welding, of a workpiece, particularly in the case of pulsed laser welding of a workpiece, acquires the sound emission signal belonging to a laser welding pulse in a window corresponding to the laser time and duration, whereby the trigger circuit acquires the beginning of the welding pulse via a photodiode attached in the region of the stray light of the laser and whereby the time duration is set at the main amplifier. Unwanted signals preceding and following the window are thereby blanked out.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
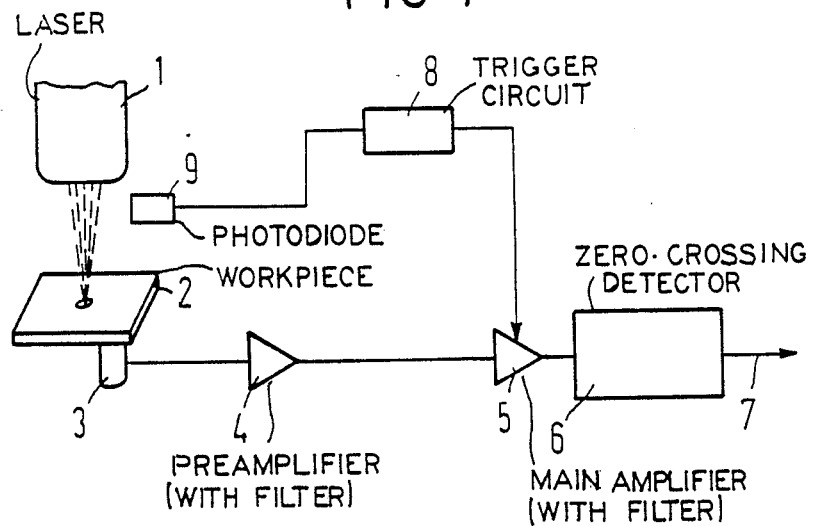
FIG. 1 is a schematic representation of an arrangement for laser welding with simultaneous sound emission measurement utilizing a trigger circuit.
Figure 2:
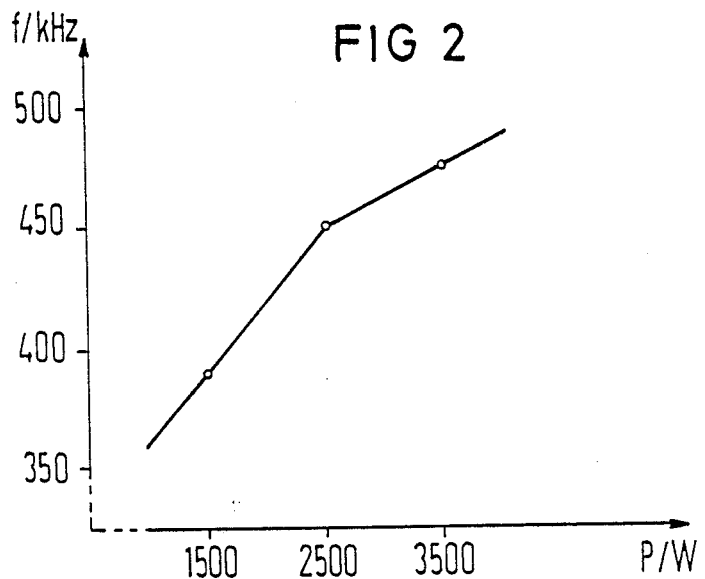
FIG. 2 is a graphic illustration of laser power P in watts on the abscissa and the frequency f of the sound emission in kHz on the ordinate.

FIG. 1 illustrates a laser 1 that processes the workpiece 2 with laser welding pulses. In this case, the duration of the laser welding pulse amounts to 2 ms. The workpiece 2 is composed of an alloy of CuSn 6. The following devices are a peizoelectric sensor 3, a preamplifier comprising a filter 4, a main amplifier comprising a filter 5 and a zero-axis crossing detector 6, in this case a transient recorder. Together with a photodiode 9 that is placed in the stray light region of the laser 1, a trigger circuit 8 sees to the triggering of the registration of the sound emission pulse at the beginning of the laser welding pulse and the main amplifier defines the time duration of the registration window. The conversion of the structure-born sound into electrical oscillations is carried out by the piezoelectric sensor 3. The electrical signal edited by the premplifier 4, comprising its filter, and the main amplifier 5 is evaluated by the zero-axis crossing detector 6 such that a mean frequency of this signal, composed of a plurality of superimposed oscillations, is identified by counting the zero-axis crossings for the time of the welding pulse of about 2 ms, that roughly corresponds to the chronological duration of the sound emission signal. The laser power corresponding to the welding pulse, being simultaneously registered, is combined with the frequency f in the diagram shown in FIG. 2. A dependency of the frequency f (measured in kHz) on the set laser power P (measured in watts) occurs in the curve that has been shown linearized in certain areas. The set laser powers between 1500 watts and 3500 watts cause sound emission frequencies of about 350–500 kHz in the workpiece used. For the purpose of automating a welding process with a laser, a check to see whether the laser power P introduced onto the workpiece varies can be undertaken by measuring the sound emission frequency after registering such a calibration curve. By fixing certain tolerance limits, therefore, a variation of the power P transmitted onto the workpiece by the laser can therefore be monitored with the measurement and evaluation of the sound emission signal. Such variations occur, for example, given an unintentional setting of the power at the laser, or given a contamination of a glaze applied as protection for the laser.

The following equipment was used for execution of the above-described example:

Sound emission pickup of Physical Acoustic Corporation, Type W 46 D-23;

Preamplifier with filter of Physical Acoustic Corporation, Type 1220 B;

Main amplifier of Physical Acoustic Corporation Type 2200; and

A transient recorder of the Kontron Company, type SMR, was utilized as the zero-axis crossing detector.

Although we have described our invention by reference to particular illustrative embodiments thereof, many changes and modifications may become apparent to those skilled in the art without departing from the spirit and scope of the invention. We therefore intend to include within the patent warranted hereon all such changes and modifications as may reasonably and properly be included within the scope of our contribution to the art.

We claim:

1. A method for identifying power output by a laser onto a workpiece, comprising the steps of:
    directing a laser beam onto a workpiece causing the generation of a sound emission signal of at least one frequency in the workpiece;
    detecting the sound emission signal; evaluating the mean frequency of the sound emission signal as a measurement of the laser power;
    setting the laser to a plurality of different power outputs; repeating for each power output the steps of detecting the sound emission signal and evaluating the mean frequency of the sound emission signal;
    plotting the means frequency evaluated for each power output for all of said plurality of power outputs to obtain a curve; and linearizing said curve.

2. An arrangement for identifying the power output by a laser onto a workpiece in which the laser causes generation of sound emission signals at the workpiece, comprising:
    a piezoelectric sensor coupled to the workpiece for detecting sound emission signals;
    a preamplifier, including a filter, connected to said piezoelectric sensor;
    a main amplifier, including a filter, connected to said preamplifier, said main amplifier having an output relative to a zero-axis; and
    a zero-axis crossing detector means connected to said main amplifier for counting the number of zero-axis crossings of said output of said main amplifier and calculating the mean frequency of said sound emission signals therefrom.

* * * * *